(12) United States Patent
Werner, II

(10) Patent No.: US 12,484,561 B2
(45) Date of Patent: Dec. 2, 2025

(54) FISHING LURE COMPONENT

(71) Applicant: Wade Corey Werner, II, Portland, TN (US)

(72) Inventor: Wade Corey Werner, II, Portland, TN (US)

(*) Notice: Subject to any disclaimer, the term of this patent is extended or adjusted under 35 U.S.C. 154(b) by 0 days.

(21) Appl. No.: 18/150,048

(22) Filed: Jan. 4, 2023

(65) Prior Publication Data

US 2023/0292724 A1  Sep. 21, 2023

Related U.S. Application Data

(63) Continuation-in-part of application No. 29/868,331, filed on Nov. 30, 2022, now Pat. No. Des. 1,022,111.

(60) Provisional application No. 63/320,518, filed on Mar. 16, 2022.

(51) Int. Cl.
*A01K 85/12* (2006.01)
*A01K 85/01* (2006.01)

(52) U.S. Cl.
CPC ............ *A01K 85/12* (2013.01); *A01K 85/017* (2022.02)

(58) Field of Classification Search
CPC .............. A01K 85/017; A01K 85/1847; A01K 85/1897
See application file for complete search history.

(56) References Cited

U.S. PATENT DOCUMENTS

| | | | | |
|---|---|---|---|---|
| 839,917 | A * | 1/1907 | Chapman | A01K 85/12 43/42.12 |
| 2,613,471 | A * | 10/1952 | Traycik | A01K 85/16 43/42.31 |
| 3,012,357 | A * | 12/1961 | Helin | A01K 85/16 43/42.74 |
| 3,757,455 | A * | 9/1973 | Strader | A01K 85/12 43/42.34 |
| 5,088,226 | A | 2/1992 | Bazinet | |
| RE35,478 | E | 3/1997 | Crihfield | |
| 6,155,000 | A * | 12/2000 | Ravencroft | A01K 85/01 43/42.31 |
| 8,024,887 | B2 | 9/2011 | Milanowski | |
| 2003/0131521 | A1 * | 7/2003 | Steeves | A01K 85/12 43/42.51 |

(Continued)

OTHER PUBLICATIONS

The Fishing Nook, Whopper Popper Rotating Rattle Tail Lure, retrieved from Internet, retrieved on Nov. 29, 2022, <URL: https://thefishingnook.com/products/pencil-fishing-lure-13g-10cm-topwater-weever-bass-perch-snakehead-rotating-spinner-rattle-tail-bait-pesca-hard-fishing-bait?_pos=1&_sid=e6b117821&_ss=r>.

*Primary Examiner* — Jessica B Wong

(57) ABSTRACT

A fishing lure apparatus designed to attract fish to the fishing pole. The lure apparatus is comprised of a lure body and a plurality of fins. The fins are angled away from the lure body in opposing orientation. The body has an attachment loop at the top of the lower body to secure the lure apparatus to a swivel device, furthermore, connecting it to a lure frame, which is connected to a fishing pole via fishing line. The lower body is hollow, forming a plurality of hollow cavities. Contained within the cavities are metal spheres. As the lure is pulled through the water, the base rotates, due to water resistance against the opposing tailfins. When the body is rotating, the internal ridges extending inward, tumble and deflect the spheres, causing them to ricochet against the rigid internal walls of the lower body, creating a continuous rattling sound.

3 Claims, 7 Drawing Sheets

(56) References Cited

U.S. PATENT DOCUMENTS

| | | | |
|---|---|---|---|
| 2006/0075676 A1* | 4/2006 | Turner | A01K 85/12 43/17.6 |
| 2010/0000145 A1* | 1/2010 | Leppala | A01K 85/01 43/42.31 |
| 2013/0247445 A1* | 9/2013 | Autrey | A01K 85/12 43/42.21 |
| 2013/0305587 A1* | 11/2013 | Takahashi | A01K 85/18 43/42.49 |

* cited by examiner

FISHING LURE COMPONENT

FIELD OF THE INVENTION

The present invention relates generally to a rotating rattling fishing lure component. More specifically, the present invention is a device that will rattle and rotate when pulled in the water to attract fish to the lure.

BACKGROUND OF THE INVENTION

Fishing lures are designed in a variety of different shapes and sizes in an attempt to attract and catch various types of fish. Fishing lures provide a variety of benefits to the fisher over live bait. Fishing lures ensures the fisher can cast further, easily interchange lure types, easily catch and release, reduces mess when setting up their lines, etc. Unfortunately, many of the fishing lures are designed with a dull color and do not have any rotational movement, decreasing the chances that a fish will be attracted to the fishing lure. Many fishing lures are designed without effective ability to produce continuous rattling sound.

An objective of the present invention is to provide users with a fishing lure, to help attract fish. The present invention intends to provide users with a device that rotates and creates a rattling noise within the water while rotating. In order to accomplish that, a preferred embodiment of the present invention comprises a lure base and a plurality of fins. Further, the lure base is designed with a hollow shape allowing for proper buoyancy and rattling noise capabilities. Thus, the present invention is a fishing lure that rotates and rattles when pulled through the water to attract a variety of fish to increase catching chances.

SUMMARY OF THE INVENTION

The present invention is a fishing lure to help fishers attract and catch more fish. The present invention seeks to provide users with a fishing lure that can create a rattling noise within the water and rotate when traversing through the water. In order to accomplish this the present invention comprises a lure base that creates a rattling sound within the water. Further, the plurality of fins is designed with a curved shape to ensure the present invention rotates when being pulled in the water. Thus, the present invention is a fishing lure that rotates and rattles when pulled through the water to attract a variety of fish to increase catching chances.

DETAIL DESCRIPTIONS OF THE INVENTION

All illustrations of the drawings are for the purpose of describing selected versions of the present invention and are not intended to limit the scope of the present invention.

Figure 1:
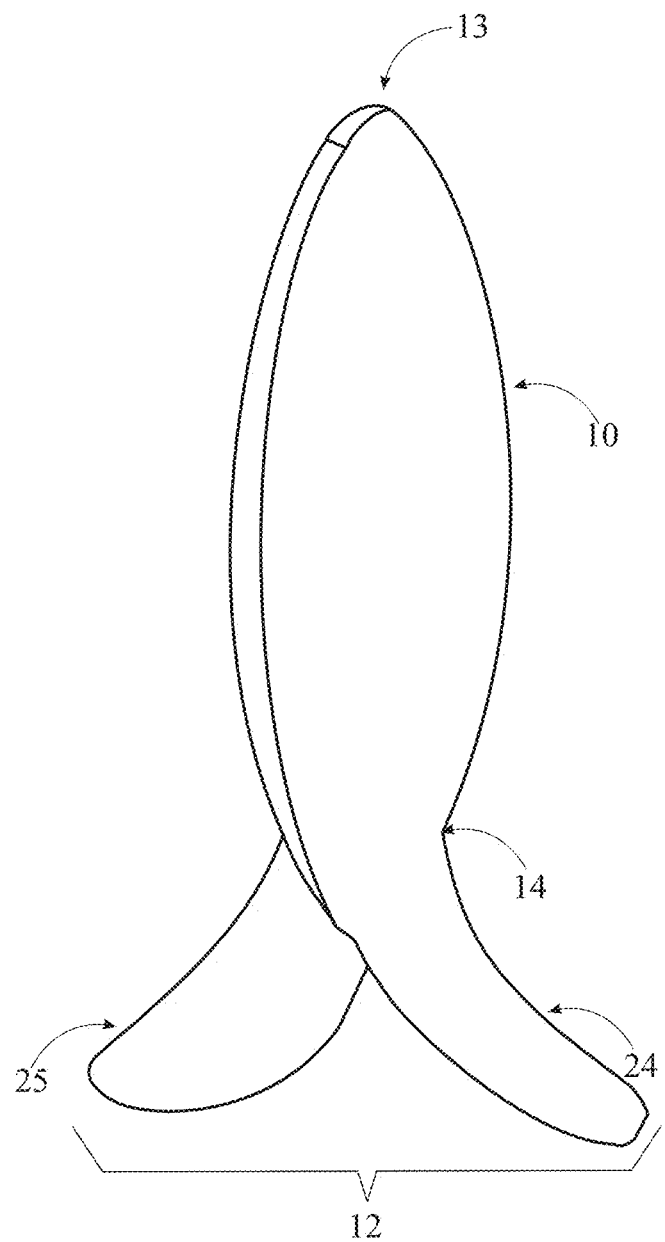
FIG. 1 is a perspective view of the present invention.
Figure 2:
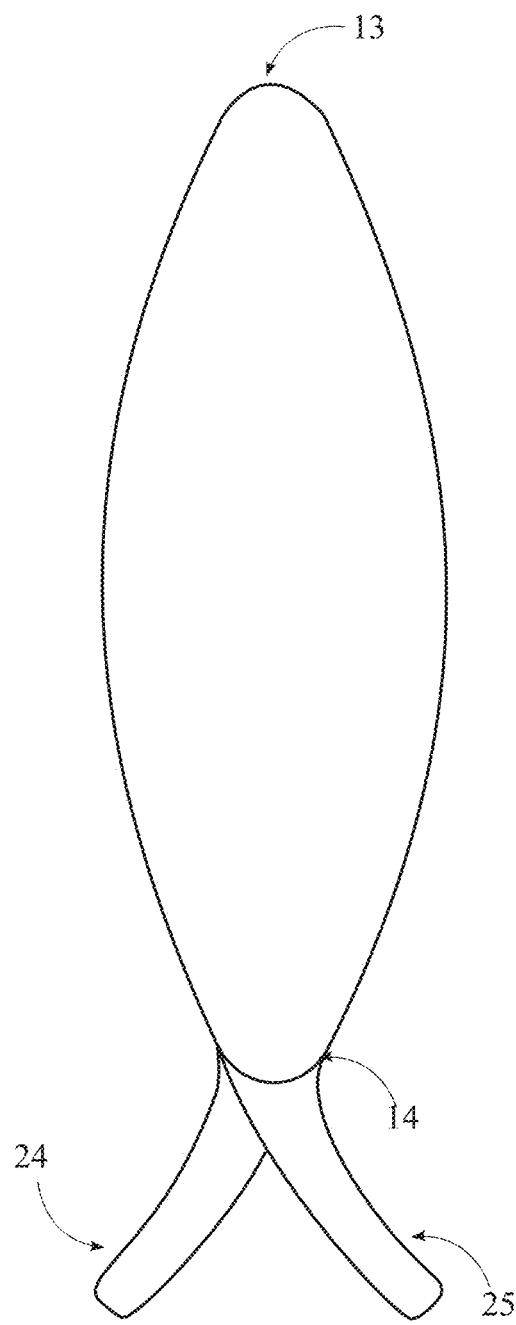
FIG. 2 is a front view of the present invention.

As shown in FIG. 1, the present invention is a fishing lure component. An objective of the present invention is to provide users with a device that can efficiently attract fish when being pulled throughout the water while being reusable. The present invention intends to provide users with a device that rotates and creates a rattling sound within the water. To accomplish this the present invention comprises a lure base 10 and a plurality of fins 12. Many of these components allow for the user to pull the fishing lure throughout the water, instigating rotational movement and a rattling sound. The plurality of fins 12 is secured to the base of the fishing lure as seen in FIG. 2. There is at least one cavity 15 within the lure base 10, however more than cavity can be present. The at least one cavity ensures that the present invention can maintain a neutral buoyancy within the water. Thus, the present invention is a fishing lure that rotates and rattles when pulled through the water to attract a variety of fish to increase catching chances.

Figure 3:
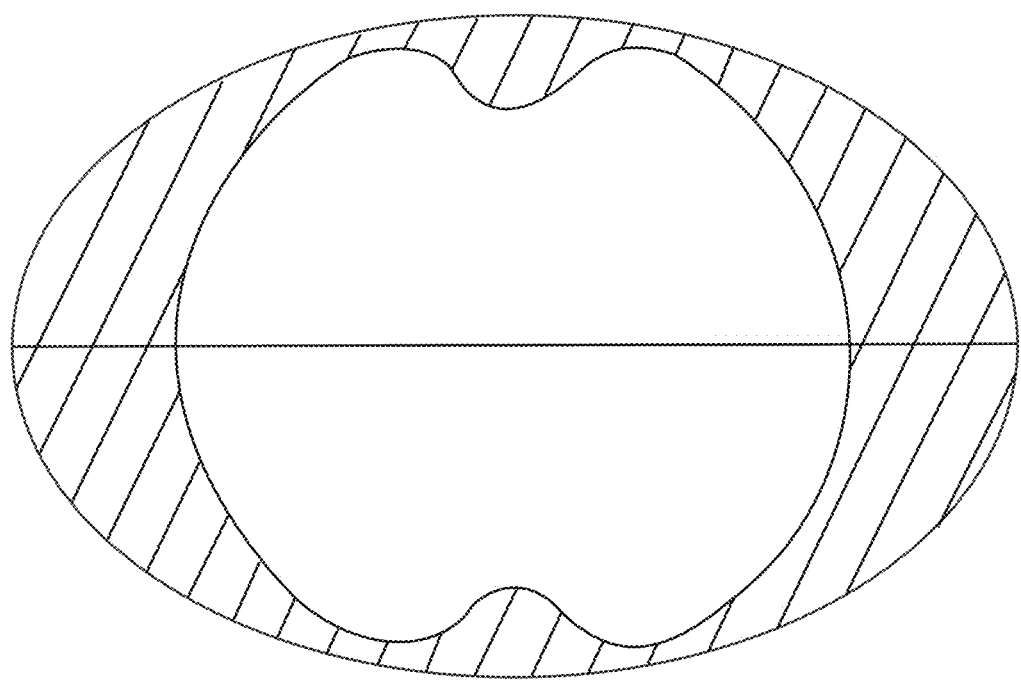
FIG. 3 is a cross sectional view of the present invention.
Figure 4:
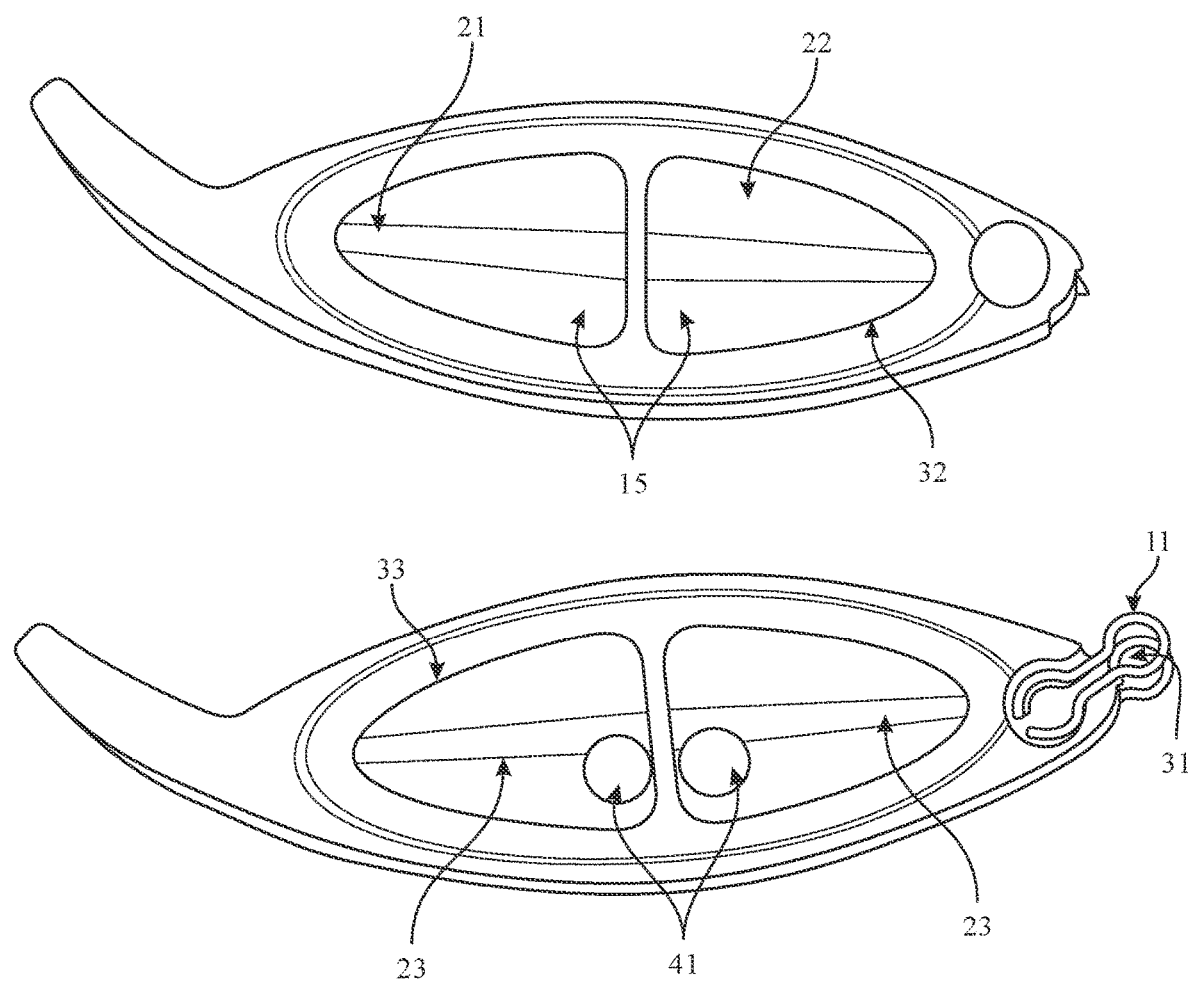
FIG. 4 is an illustration of the present invention.
Figure 6:
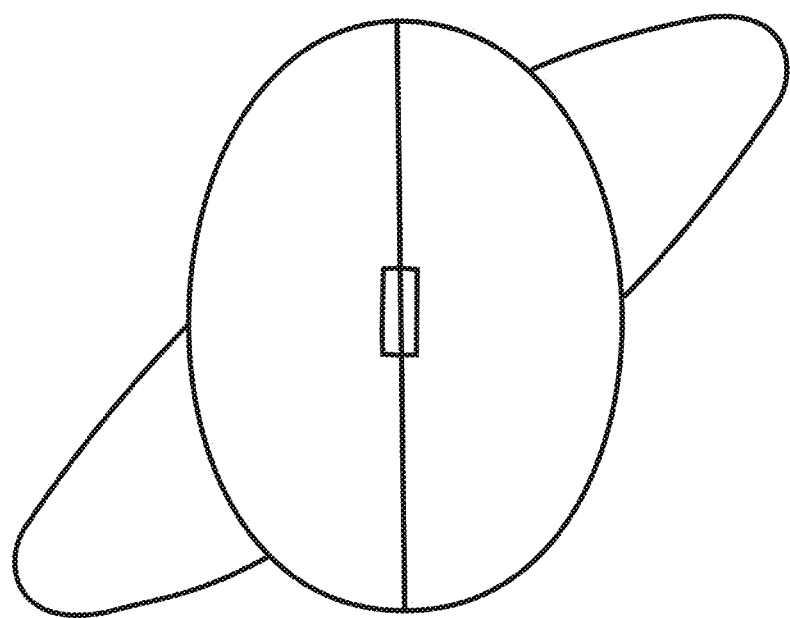
FIG. 6 is a top view of the present invention.

The present invention is secured to a fishing line via the lure base 10. The lure base 10 is made of a molded resin body such as ABS with an ovular type of shape. The outer surface of the lure base 10 is coated with a reflective finish designed to increase fish catching potential. In its preferred embodiment the lure base 10 comprises at least one cavity 15, a lure loop 11, and at least one sphere 41. The at least one cavity 15 is located within the lure base 10 as seen in FIG. 3. The at least one cavity 15 is designed as a rounded hollow section. The at least one cavity 15 contains a plurality of ridges 23 along the front sidewall 32 and rear sidewall 33 of the at least one cavity 15. The plurality of ridges 23 directly extends inwards from the side of the at least one cavity 15 creating an uneven surface. The ridges extend the entire length of the at least one cavity of the lure body. The at least one sphere 41 is positioned within the at least one cavity 15. The at least one sphere 41 is designed with a rigid material to create a BB such as a hard plastic or metal. The at least one sphere 41 interacts with the plurality of ridges 23 allowing the at least one sphere 41 to tumble within the at least one cavity 15 as seen in FIG. 4. While the present invention rotates the plurality of ridges 23 initiates the rattling sound of the at least one sphere 41 tumbling within the at least one cavity 15 and hitting the inner surface. This design ensures that the present invention initiates the rattling sound and is not limited to making the sound only when the present invention stops or loses centrifugal force on the internal rattling components. Further, this design that creates the rattling sound produces a desirable attraction quality for a variety of game fish, increasing the likelihood that a fish is caught when using the present invention. Furthermore, the at least one cavity 15 is sealed shut, to secure the at least one sphere 41 and prevent water intrusion, creating an air cavity that maintains a neutral buoyancy for the present invention while within the water. The lure base 10 has a top side 13 and a bottom side 14. The lure loop 11 is positioned at the top side 13 of the lure base 10. The lure loop 11 comprises a loop aperture 31. The lure loop 11 is a metal fastener that connects the lure base 10 to a rotating tumbler system as shown in FIG. 6. The rotating tumbler system is a mechanical device that allows for movement around the vertical axis of symmetry of the present invention in the manner of rotational motion. This design ensures that a centrifugal force cannot be used to hold the at least one sphere 41 from creating a consistent rattling noise. It should be further noted that, the lure base 10 can be created in many various shapes and sizes and lure loop 11 can be designed with various configurations of tumbler systems to promote rotational motion while still staying within the scope of the present invention.

Figure 5:
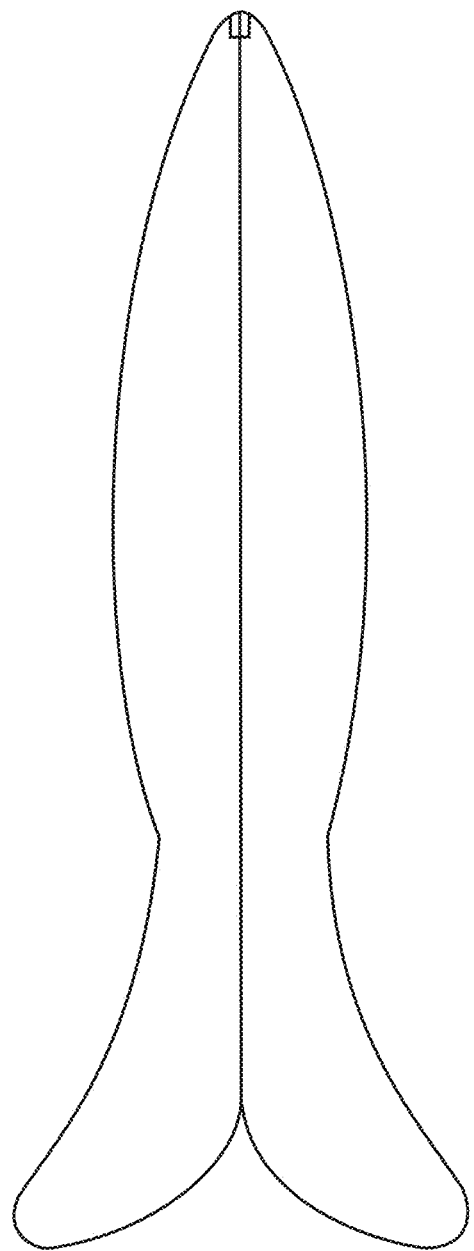
FIG. 5 is a left-side view of the present invention.
Figure 7:
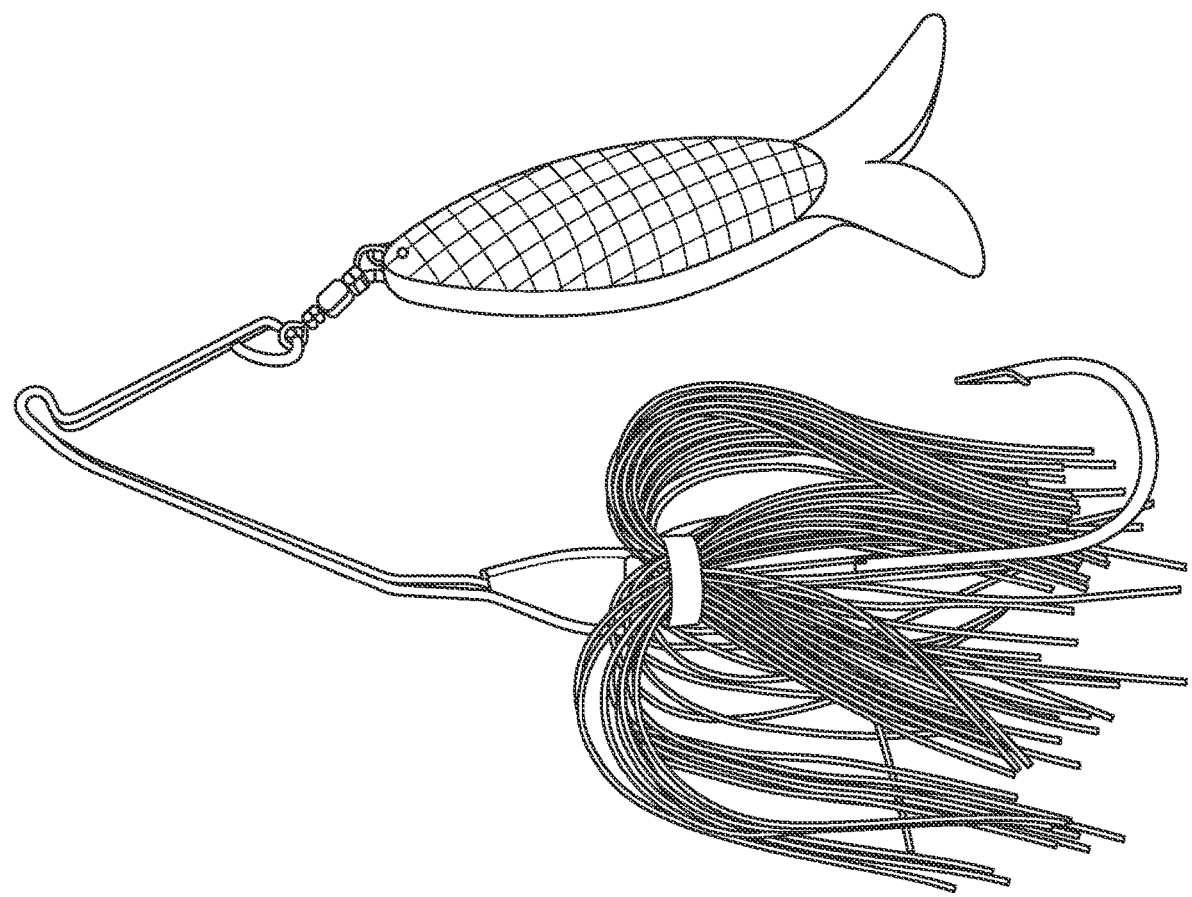
FIG. 7 is a illustration view of the present invention.

The plurality of fins 12 connects with the present invention at the bottom side 14 of the lure base 10 as seen in FIG. 5. In its preferred embodiment the plurality of fins 12 is designed with a similar material to the lure base 10 with a molded resin body such as ABS plastic material. The plurality of fins 12 curves outwards from the lure base 10 to resemble a two finned torpedo shape. The plurality of fins 12 comprises a first fin 24 and a second fin 25. This curved shape ensures that as the present invention moves through the water the plurality of fins will initiate rotational motion. The plurality of fins 12 extends outwards away from each other as seen in FIG. 7. The first fin 24 and second fin have opposing orientation to one another. The opposing orientation ensures that the fishing lure rotates uniformly. With all the components working in tandem with each other it can be seen that, the present invention is a fishing lure that rotates and rattles when pulled through the water to attract a variety of fish to increase catching chances.

Although the invention has been explained in relation to its preferred embodiment, it is to be understood that many other possible modifications and variations can be made without departing from the spirit and scope of the invention.

What is claimed is:

1. A fishing lure apparatus comprising:
a lure base;
a plurality of fins;
a lure loop;
at least one sphere; and
the lure base further comprising at least one cavity;
the lure loop comprising a loop aperture;
the at least one cavity further comprising a plurality of ridges;
the at least one cavity having a front sidewall;
the at least one cavity having a rear sidewall;
each of the plurality of ridges traversing the length of the at least one cavity; and
each of the plurality of ridges extending inwards from the front side wall and rear sidewall of the at least one cavity.

2. The fishing lure apparatus as in claim 1 further comprising:
the lure base having a top side and a bottom side; and
the lure loop being positioned at the top side of the lure base.

3. The fishing lure apparatus as in claim 1 further comprising:
the plurality of fins comprising a first fin and a second fin;
the plurality of fins attaching to the bottom side of the lure base;
the at least one sphere being contained within the at least one cavity; and
each of the plurality of fins curving outward from the lure base.

* * * * *